United States Patent [19]

Healy et al.

[11] 4,069,181

[45] Jan. 17, 1978

[54] ASPHALT COMPOSITIONS

[75] Inventors: James Churchill Healy; Roy Francis Whitaker, both of Avon, Ohio

[73] Assignee: The B. F. Goodrich Company, Akron, Ohio

[21] Appl. No.: 700,445

[22] Filed: June 28, 1976

[51] Int. Cl.² ............................................. C08L 95/00
[52] U.S. Cl. ............................ 260/28.5 AS; 260/42.43
[58] Field of Search ................................ 260/28.5 AS

[56] References Cited

U.S. PATENT DOCUMENTS

| | | | |
|---|---|---|---|
| 3,278,472 | 10/1966 | Tamblyn et al. | 260/28.5 AS |
| 3,669,918 | 6/1972 | Raley, Jr. | 260/28.5 AS |
| 3,790,519 | 2/1974 | Wahlborg | 260/28.5 AS |
| 3,890,263 | 6/1975 | Meynard | 260/28.5 AS |
| 3,963,659 | 6/1976 | Binder et al. | 260/28.5 AS |

*Primary Examiner*—Melvyn I. Marquis
*Attorney, Agent, or Firm*—Joe A. Powell; J. Hughes Powell, Jr.

[57] ABSTRACT

Asphalt cement compositions are produced which contain an EPDM or EPM elastomer. The elastomer is premixed with a high DBP absorption value reinforcing carbon black to form a bound rubber masterbatch. The specific gravity of the masterbatch is substantially equivalent to the specific gravity of the asphalt cement or asphalt.

14 Claims, No Drawings

ASPHALT COMPOSITIONS

BACKGROUND OF THE INVENTION

The use of elastomers as an additive to ashalts has been known to improve the properties of the asphalts. In asphalt roads, the addition of elastomers to the asphalt has shown the following advantages: improved stability under high temperatures, better flexibility at low temperatures, less cracking and crazing, no bleeding which results in better wet and dry skid resistance, better wear resistance, better resistance against stripping, better aging resistance, increased stability, better resistance to moisture penetration, more resilience, therefore, less long term creep, improves ductility, greater compressive strength, higher surface luminosity for better light reflection.

Because of their excellent aging qualities, elastomers made from ethylene and propylene such as the ethylene-propylene-diene random terpolymer referred to as EPDM, and the random ethylene-propylene copolymer referred to as EPM have been of particular interest as additives to asphalts. U.S. Pat. No. 3,669,918 discloses that when small amounts of an EPM copolymer are mixed with asphalt cement, the flexibility and impact strength of the asphalt cement are increased. U.S. Pat. No. 3,890,263 discloses that the viscosity of asphalt cement can be increased by the addition to the asphalt cement of a mixture of EPDM and polypropylene.

Unfortunately, EPDM and EPM elastomers are incompatible with typical asphalt cements and even after mixing thoroughly if allowed to stand at elevated temperatures, as is often required in practice, the elastomer will float to the surface of the asphalt cement and the advantages are lost.

SUMMARY OF THE INVENTION

An improved stable, uniform, asphalt cement or asphalt composition is obtained by blending asphalt cement with an EPDM or EPM elastomer that has first been premixed with high DBP absorption value reinforcing carbon black to form a bound rubber masterbatch. The quantity of carbon black premixed into the elastomer is such that the specific gravity of the masterbatch is substantially equal to the specific gravity of the asphalt cement.

DETAILED DESCRIPTION

An elastomer is defined as a material, such as synthetic rubber, which at room temperature can be stretched under low stress to at least twice its original length and, upon immediate release of the stress, will return with force to its approximate original length.

The elastomers used are EPDM or EPM, more preferably EPM. The elastomers can be oil extended or non-oil extended. The elastomers used in this invention are well-known commercially available elastomers. Such elastomers are readily prepared as is widely described in patents and the published literature by polymerizing ethylene and at least one other alpha olefin containing from 3 to about 6 carbon atoms as propylene or butene-1. The EPDM elastomers employed have an ethylene content of from about 10% to about 90% by weight, an alpha olefin content of from about 10% to about 80% by weight, and a polyene content of from about 0.5% to about 20% by weight, all weights based on the total weight of the polymer. The polyene can be a conjugated diene such as isoprene, butadiene, chloroprene, and the like; a non-conjugated diene; a triene, or a higher enumerated polyene. The non-conjugated dienes containing from about 5 to about 25 carbon atoms are more preferred. Examples of non-conjugated dienes are 1,4-hexadiene, ethylidene norbornene, dicyclopentadiene, methyltetrahydroindene and the like.

Preferably, the EPDM elastomers contain from about 20% to about 80% by weight of ethylene. From about 20% to about 70% by weight of propylene, and from about 1% to about 10% by weight of a non-conjugated diene. More preferably, the EPDM elastomers have an ethylene content of from about 50% to about 75% by weight, a propylene content of from about 25% to about 50% by weight, and a non-conjugated diene content from about 1% to about 10% by weight.

The EPDM elastomers have molecular weights from about 20,000 to about 2,000,000 or more. They have dilute solution viscosities (DSV) from about 1 to about 5, measured at 25° C. on a solution of 0.2 gram of polymer in 100CC. of toluene. In measuring DSV of elastomers with molecular weights above about 1,000,000, a solution of 0.1 gram of polymer in 100CC. of toluene is used.

The EPM elastomers are copolymers of ethylene and propylene. The EPM elastomers have an ethylene content of from about 10% to about 90% with the remainder of the polymer being propylene, butene-1 and the like. Preferably, the EPM elastomers have an ethylene content of from about 30% to about 80% and more preferably they have an ethylene content of from about 50% to about 75% with the remainder of the polymer being propylene.

The EPM copolymers have molecular weights from about 20,000 to about 2,000,000 or more. They have dilute solution viscosities from about 1 to about 5, measured at 25° C on a solution of 0.2 gram of polymer in 100CC. of toluene (0.1 gram of polymer in 100CC. of toluene for elastomers with molecular weights greater than about 1,000,000).

EPM elastomers with greater than 50% ethylene content are preferred over EPDM and lower ethylene content EPM because of the superior aging characteristics of high ethylene content EPM.

High DBP absorption value reinforcing carbon blacks are premixed with an EPDM or EPM elastomer or a blend of more than one such elastomers. Examples of high DBP absorption value reinforcing carbon blacks are those with ASTM designation N110, N121, N219, N220, N231, N234, N242, N330, N339, N347, N351, N358, N375, N539, N550, N568, N650, N660, N765 and the like. Dibutyl phthalate (DBP) absorption value is measured by the method specified in ASTM D2414. The DBP absorption values are usually reported in cubic centimeter of DBP absorbed per 100 grams of carbon black. The DBP absorption value of a carbon black is a function of its particle size and its structure. The smaller the particle size for a given structure, the higher the DBP absorption value and the higher the structure for a given particle size, the higher the DBP absorption value. Preferably, the carbon blacks used have a DBP absorption value of greater than about 80, more preferably greater than about 120. Examples of carbon blacks with a DBP absorption value of greater than about 120 are N121, N234, N242, N339, N347, N351, N358, N550, N568, N650 and the like. One or a blend of more than one high DBP absorption value reinforcing carbon black is mixed with the EPDM or EPM elastomer. The amount of high DBP absorption value reinforcing carbon black premixed with the elastomer should be such that the specific gravity of the elastomer-carbon black-processing aid mixture is within 0.2 gram per cubic centimeter of the specific gravity of the asphalt cement in which it is to be used. Preferably, the specific gravity of the elastomer-carbon black-processing aid mixture is within 0.1 gram per cubic centimeter of the specific gravity of the asphalt cement in which it is to be used. The level of carbon black used is from about 10 to about 150 parts by weight of carbon black per 100 parts by weight of elastomer.

The necessary premixing of the high DBP absorption value reinforcing carbon black with the elastomer is performed on conventional rubber mixing equipment such as a mill, banbury, or continuous extrusion mixer in order to obtain the desired degree of dispersion and elastomer bount to carbon black surfaces. The nature and amount of mixing should be such that a dispersion value of from about 3 to about 5, preferably from about 4 to about 5 is obtained as measured by ASTM D2663 method A. If ASTM D2663 method B is used to measure dispersion, then the dispersion value should be from about 95% to about 99%, preferably from about 97% to about 99%. The working of the rubber and carbon black in conventional rubber mixing equipment is necessary to obtain the desired levels of dispersion and to bind the carbon black to the rubber. During the mixing process, part of the elastomer becomes attached to the high DBP absorption value reinforcing carbon black so that it cannot be extracted with regular elastomer solvents. This insoluble elastomer is the bound rubber. High DBP absorption value reinforcing carbon blacks binds a portion of the elastomer, while non-reinforcing fillers and low DBP absorption value carbon blacks are bound to practically none of the elastomer. As an example, 50 parts by weight of N234 carbon black mixed with 100 parts by weight of elastomer will result in from about 30% to about 40% bound rubber. That is, from about 30% to about 40% of the rubber originally present in the mixture is bound with the carbon black such that the elastomer cannot be extracted with regular elastomer solvents such as benzene.

To facilitate processing, other ingredients can be added to the elastomer-carbon black mixture including, for example, oils, stearic acid, zinc stearate, plasticizers and the like. Asphalt cements can be mixed with the elastomer-carbon black mixture as a processing aid in quantities of up to about 100 parts by weight of ashphalt cement per 100 parts by weight of elastomer. The level of processing aid used will increase as the level of a given carbon black is increased. One, or a mixture of more than one, processing aid may be used. The mixture of elastomer, carbon black, and processing aid is hereinafter referred to as a "masterbatch".

Once the masterbatch is mixed, it is ready to be added to the asphalt cement. The masterbatch can be added as one piece or it can be cut, chopped, or granulated into several pieces before addition to the asphalt cement. The time required to blend the masterbatch with the asphalt cement is greatly reduced by cutting, chopping, or granulating the masterbatch into small pieces. Preferably, the masterbatch is granulated to a particle size of from about 1mm to about 100mm, more preferably from about 1mm to about 10mm. Levels of from about 1 to about 30 parts by weight of the masterbatch per 100 parts by weight of asphalt cement are used, preferably from about 1.5 to about 10 parts by weight of the masterbatch per 100 parts by weight of the asphalt cement.

Asphalt cements and asphalts are normally classified according to their penetration grade as in ASTM D5. The penetration value is inversely proportional to the viscosity. The asphalt cements used have penetration values of from about 10 to about 300 at 25° C, preferably from about 45 to about 100 at 25° C. The asphalt cements used have a specific gravity of from about 0.90 to about 1.50 grams per cubic centimeter, preferably from about 1.00 to about 1.20 grams per cubic centimeter.

The asphalt cement is heated to a temperature of from about 400° F to about 500° F, preferably about 470° F and the masterbatch is added to the hot asphalt cement. The mixture is then heated to a temperature of from about 550° F to about 620° F, preferably about 590° F, and this temperature is maintained for a period of from about 1 to about 3 hours. To prevent oxidation of the asphalt cement while it is being heated, it is heated in a predominantly oxygen free atmosphere. This can be accomplished by either a closed system, such as a cover on the container used to heat the asphalt cement or by continuously blowing a stream of nitrogen gas over the hot asphalt cement while it is being heated. The mixture is then agitated while allowed to cool to a temperature of about 350° F. Antioxidants for asphalt cements, such as lead diethyl dithiocarbamate and zinc dimethyl dithiocarbamate, may be added to the asphalt cement mixture during the agitation period.

The invention may be more fully understood by reference to the following exmaple.

EXAMPLE 70 parts by weight of N347 (high structure HAF) carbon black is mixed with 100 parts by weight of an EPM elastomer. The elastomer used is a copolymer of ethylene and propylene with about 60% ethylene and about 40% propylene and a molecular weight average of about 120,000 and having a Large Rotor Mooney Viscosity of about 30 after 8 minutes at 212° F. The mixing is conducted in a banbury mixer to facilitate better dispersion of the carbon black in the elastomer. The carbon black is allowed to disperse in the elastomer to a dispersion level of 4 as measured by ASTM D2663 method A before the processing aid is added to the mix. 30 parts of 45 penetration value asphalt cement is added to the mixture as a processing aid. Once the processing aid is mixed into the elastomer-carbon black mixture, it is referred to as a masterbatch and is removed from the banbury mixer and sheeted out on a mill to a thickness of about 5mm. The masterbatch is cut into small pieces of about 5mm size. The masterbatch is now ready to be added to the hot asphalt cement. Six parts by weight of masterbatch per 93 parts by weight of asphalt cement is added to each of 3 different asphalt cement grades (45, 65, and 90 penetration value asphalt cements). All 3 asphalt cements plus masterbatch samples are prepared by the same method, which is to first place the asphalt cement in a covered container and heat the asphalt cement to about 470° F. Then add the small pieces of masterbatch to the hot asphalt cement. The asphalt cement is further heated to about 590° F. The temperature of the asphalt cement is maintained at 590° F. for 1 hour. The asphalt cement is then cooled to about 470° F and the asphalt cement is agitated while further cooling occurs. Agitation is continued until the masterbatch is well dispersed in the ashalt cement. During the agitation period, 1 part by weight of zinc dimethyl dithiocarbamate per 93 parts by weight of asphalt cement is added to the asphalt cement and thoroughly mixed into the asphalt cement. The stability of the masterbatch in the asphalt cement is evaluated by placing the asphalt cement in a hot air oven at 275° F for 16 hours and observing if any of the masterbatch floats to the top of the asphalt cement. In all 3 asphalt cement-masterbatch blends prepared, the masterbatch remained in suspension in the asphalt cement after the hot oven test.

The Table on page 10 shows the physical properties of 3 asphalt cements versus the same 3 asphalt cements with the EPM masterbatch added to the asphalt cement.

The asphalt cement compositions prepared by this invention have many uses including, for example, asphalt roofing cements, mastics, moisture barriers, sheeting, upgrading lower viscosity asphalt cements, and they could be mixed with aggregate to form a road paving material.

TABLE*

|  | 45 Penetration Asphalt Cement | | 65 Penetration Asphalt Cement | | 90 Penetration Asphalt Cement | |
|---|---|---|---|---|---|---|
|  | Original | With EPR Masterbatch | Original | With EPR Masterbatch | Original | With EPR Masterbatch |
| Softening Point, Ring and Ball ° F | 124 | 134 | 121 | 137 | 112 | 124 |
| Viscosity |  |  |  |  |  |  |
| Saybolt Furol Sec. at 350° F | 53.8 | 97.5 | 32.2 | 93.3 | 30.2 | 75.7 |
| Saybolt Furol Sec. at 275° F | 297 | 583 | 172 | 580 | 152 | 418 |
| Absolute at 140° F, Poises | 4051 | 9457 | 2567 | 10823 | 1407 | 4458 |
| Penetration at 77° F, 100 g, 5 Sec. | 51 | 43 | 60 | 43 | 96 | 69 |
| Penetration at 32° F, 200 g, 60 Sec. | 6 | 14 | 11 | 18 | 20 | 23 |
| Thin Film Oven Test |  |  |  |  |  |  |
| Penetration of Residue at 77° F | 38 | 35 | 41 | 35 | 64 | 52 |
| Absolute Viscosity at 140° F, Poises | 7453 | 16256 | 4923 | 17199 | 2621 | 7225 |

*Testing Performed by the Louisiana Department of Highways

Webster's Unabridged Dictionary defines asphalt cement as follows: a refined asphalt free from water and coarse foreign material and containing less than one percent of ash. Webster's defines asphalt as follows: a brown to black bituminous substance found native around the Dead Sea, in Trinidad, and elsewhere and also obtained as a residue from certain petroleums, coal tar, and lignite tar consisting chiefly of a mixture of hydrocarbons, varying from hard and brittle to plastic in form, melting on heating, being insoluable in water but soluable in gasoline, and used especially for paving and roofing, in paints and varnishes, and because light renders certain grades insoluable in oil of turpentine for photomechanical work. These two terms are often used interchangeably in the trade. In this application, whenever the terms asphalt or asphalt cement are used, the two terms are intended to be interchangeable and to include natural occurring asphalt as well as asphalt cement derived from petroleum.

We claim:

1. An asphalt composition containing 100 parts by weight of an asphalt and from about 1 to about 30 parts by weight of a bound rubber masterbatch consisting of at least one elastomer selected from the group consisting of ethylene-propylene-diene terpolymer and ethylene-propylene copolymer and at least one carbon black having a dibutyl phthalate absorption value greater than 120 wherein said elastomer is first premixed with said carbon black to form a bound rubber masterbatch, and said masterbatch is then mixed with said asphalt, and the quantity of said carbon black that is first premixed with said elastomer is sufficient to increase the specific gravity of the bound rubber masterbatch to a value within 0.2 gram per cubic centimeter of the specific gravity of the asphalt cement.

2. A composition of claim 1 wherein the quantity of high dibutyl phthalate absorption value reinforcing carbon black that is premixed with the elastomer is sufficient to increase the specific gravity of the masterbatch to a value within 0.1 grams per cubic centimeter of the specific gravity of the asphalt cement.

3. A composition of claim 1 wherein the quantity of carbon black is from about 10 to about 150 parts by weight per 100 parts by weight of the elastomer.

4. A composition of claim 3 wherein the quantity of the masterbatch is from about 1.5 to about 10 parts by weight per 100 parts by weight of the asphalt.

5. A composition of claim 4 wherein the asphalt cement has a penetration value at 25° C from about 10 to about 300.

6. A composition of claim 5 wherein the elastomer is an ethylene-propylene copolymer having an ethylene content of from about 50% to about 75%.

7. A composition of claim 6 wherein the quantity of carbon black is from about 20 to about 80 parts by weight per 100 parts by weight of the elastomer and said carbon black has a dibutyl phthalate absorption value greater than 120 and the quantity of masterbatch is from about 3 to about 10 parts by weight per 100 parts by weight of the asphalt cement and the asphalt cement has a penetration value of from about 30 to about 100.

8. A method of producing an asphalt composition containing 100 parts by weight of an asphalt and from about 1 to about 30 parts by weight of a bound rubber masterbatch consisting of at least one elastomer selected from the group consisting of ethylene-propylene-diene terpolymer and ethylene-propylene copolymer and at least one carbon black having a dibutyl phthalate absorption value greater than 120 wherein said elastomer is first premixed with said carbon black to form a bound rubber masterbatch and then said masterbatch is mixed into the asphalt, and the quantity of said carbon black that is first premixed with said elastomer is sufficient to increase the specific gravity of the bound rubber masterbatch to a value within 0.2 gram per cubic centimeter of the specific gravity of the asphalt cement.

9. A method of claim 8 wherein the quantity of high dibutyl phthalate absorption value reinforcing carbon black that is premixed with the elastomer is sufficient to increase the specific gravity of the masterbatch to a value within 0.1 grams per cubic centimeter of the specific gravity of the asphalt cement.

10. A method of claim 8 wherein the quantity of carbon black is from about 10 to about 150 parts by weight per 100 parts by weight of the elastomer.

11. A method of claim 10 wherein the quantity of the masterbatch is from about 1.5 to about 10 parts by weight per 100 parts by weight of the asphalt.

12. A method of claim 11 wherein the asphalt cement has a penetration value at 25° C from about 10 to about 300.

13. A method of claim 12 wherein the elastomer is an ethylene-propylene copolymer having an ethylene content of from about 50% to about 75%.

14. A method of claim 13 wherein the quantity of carbon black is from about 20 to about 80 parts by weight per 100 parts by weight of the elastomer and said carbon black has a dibutyl phthalate absorption value greater than 120 and the quantity of masterbatch is from about 3 to about 10 parts by weight per 100 parts by weight of the asphalt cement and the asphalt cement has a penetration value of from about 30 to about 100.

* * * * *